United States Patent Office 3,579,611
Patented May 18, 1971

3,579,611
CROSSLINKED POLYOXYETHYLENES AND PROCESS THEREFOR
Fred F. Holub and Moyer M. Safford, Schenectady, N.Y., assignors to General Electric Company
No Drawing. Filed Dec. 26, 1967, Ser. No. 693,166
Int. Cl. C08f 29/50, 27/00
U.S. Cl. 260—874                                      10 Claims

ABSTRACT OF THE DISCLOSURE

Polyoxyethylenes are mixed with an organic crosslinking agent and an organic peroxide and heated at elevated temperatures to crosslink the polyoxyethylene to yield a water-insoluble polymer. These crosslinked polyoxyethylene compositions are useful as membrane material, wire coating, and the like and as water-insoluble coatings for cloth, metal, metallic screen, etc.

---

Polyoxyethylenes have been utilized in the prior art for the production of elastomers, as adhesives, cosmetics, pharmaceuticals, in binder systems, detergents, extruded shapes and water-soluble packaging films. These polyoxyethylenes suffered the disadvantage in that they are all extremely soluble in water and therefore are dissolved when subjected to systems containing water.

In preparing elastomers by the prior art method, the polyoxyethylenes have been reacted with polyphenolic materials to form epoxy resin elastomers. They have also been reacted to form polyurethane-type elastomers. Efforts to provide a suitable polyoxyethylene elastomer by vulcanization of the polyoxyethylene itself have been generally unsuccessful. Since there are no double bonds present in polyoxyethylene compounds, or their polymeric reaction products, the usual crosslinking procedures and practices are not applicable.

It is an object of the present invention to provide a process whereby the water-soluble properties of the polyoxyethylenes can be modified to render these polymers relatively insoluble in water and thus take advantage of their hydrophillic characteristics to produce permselective membranes, desalination membranes and the like.

It is a further object of this invention to provide for the crosslinking of the polyoxyethylenes to produce elastomers thereby extending the utility of these polyoxyethylenes to uses as rubbery permselective membranes and the like.

Additional objects will be apparent to one skilled in the art and still others will become apparent hereinafter.

In accordance with this invention, a polyoxyethylene free of unsaturation and having a molecular weight of from about 20,000 to 20 million or higher is crossed with an organic crosslinking agent containing multiple, aliphatic double bonds and a free radical vulcanizing agent or catalyst such as dicumyl peroxide.

Other materials such as antioxidants, fillers, reinforcing materials, and extenders, commonly used in the art such as zinc oxide, stearic acid and carbon black may also be incorporated in the compositions of this invention. When the composition is cured at the proper temperature and for the proper time, a water-insoluble crosslinked material results, which has many desirable properties.

The polyoxyethylenes employed in the instant invention have molecular weights ranging from about 20,000 to 20 million or higher and are produced by the polymerization of ethylene oxide employing a zinc-di-n-butyl/aluminum triisopropoxide/$H_2O$ catalyst at a 1:1:1 mole ratio (0.5 mole percent zinc based on monomer); or, by employing a zinc/aluminum/water catalyst in a 1.5:1:0.5 ratio (0.75 mole percent zinc based on monomer) in accordance with known procedures.

Suitable peroxides for crosslinking the polyoxyethylene compositions of this invention are generally diperoxides, hydroperoxides and hydrogen peroxide. Suitable peroxy materials include diacylperoxides, diarylperoxides, such as lauroyl peroxide, caprylyl peroxide, acetyl peroxide, benzoyl peroxide; chloro-diaroyl peroxides, such as 2,4-dichlorobenzoyl peroxide, p-chlorobenzoyl peroxide; dialkyl peroxides, such as di-t-butyl peroxide, tertiarybutyltertiarytriptyl peroxide and the like, diarylalkyl peroxides, such as dicymyl peroxide, etc.; alkylhydroperoxides and cycloalkylhydroperoxides, such as t-butyl hydroperoxide, p-menthane hydroperoxide, pinene hydroperoxide; aralkylhydroperoxides, such as cumene hydroperoxide, etc.; alkyl dihydroperoxides, such as 2,5-dimethylhexane-2,5-dihydroperoxide; alkyl esters of peroxyacids, such as t-butyl peroxyisobutyrate, t-butyl perbenzoate, t-butyl peracetate, di-t-butyl diperphthalate, etc.; and other peroxides which are generally classified as free radical catalysts. Other free radical catalysts which may be employed in the composition of the instant invention include $\alpha,\alpha$-azo-bis-diisobutyronitrile and other azo compounds, etc.

The proportion by weight of the free radical catalyst, e.g., peroxide, employed for the heat-curing of the compositions of this invention may be varied on a weight basis, in the range of from about 0.1 part to 10 parts and preferably, from about 0.5 part to about 5 parts per 100 parts of the polyoxyethylene.

The crosslinking agents which can be employed in the compositions of this invention include the compositions containing at least 2 aliphatic carbon-to-carbon double bonds and include esters such as allyl acrylate, allyl methacrylate, methylene dimethylacrylate, ethylene dimethacrylate, methylene dimethylacrylate, ethylene dimethacrylate, triethylene glycol dimethacrylate, diallyl maleate, diallyl phthalate, ethylene glycol bis(allyl carbonate), resorcinol dimethacrylate, triallyl cyanurate, triallyl isocyanurate, and pentaaerythrityl tetramethacrylate, glycerol trimethacrylate, etc.; amides, such as allyl acrylamide, allyl methacrylamide, and N,N'-methylenediacrylamide; and imides, such as 2,4-tolylenedimaleimide, 1,4-cyclohexylenedimaleimide, m-phenylenedimaleimide, etc.

The amount of the crosslinking agent employed in producing the heat-curable compositions of this invention can vary on a weight basis, from about 0.5 part to 40 or more parts per 100 parts of the polyoxyethylene. It is preferred to employ the crosslinking agent in amounts of from 3 to 15 parts per 100 parts of the polyoxyethylene polymer.

The heat-cured compositions of this invention are useful as water-swellable coatings for glass cloth, rayon cloth, wood and plastic materials which can then be used as desalination membranes and the like. These heat-curable compositions wherein the acrylic materials are employed as a crosslinker, can be hydrolyzed to form polyelectrolyte membranes which are useful as ion exchange membranes, permselective membranes, etc.

The heat-curable compositions of this invention can be blended with other water-soluble copolymers, such as ethylenemethacrylic acid copolymers, polyvinylalcohol, etc., and then crosslinked by heat.

The following examples serve to further illustrate this invention. All parts are parts by weight unless otherwise expressly set forth.

EXAMPLE 1

The heat-curable compositions can be prepared by the following general procedure:

Polyoxyethylene (100 parts) is placed on a two-roll differential speed rubber mill at a temperature of about 80° to 110° C. and the polyaliphatically unsaturated crosslinking agent is added with milling to give an intimate dispersion of the crosslinking agent and the polyoxyethylene. The peroxide is then added with milling to give a thorough dispersion of the peroxide, polyoxyethylene and the crosslinking agent, to gave the heat-curable composition. The composition is then heated in air, either without pressure or under pressure at a temperature of from 150° to 175° C. to give a crosslinked polyoxyalkylene polymer. The following table gives results of varying the peroxide and the crosslinking agent. In this table, the peroxide is dicumyl peroxide and the crosslinking agent is triallylcyanurate.

TABLE I

| Sample | Parts Dicumyl peroxide | Parts Triallyl- cyanurate | Time of cure at 160° C. (min.) | Tensile at 125° C. (p.s.i.) | Elongation at 125° C. (percent) |
|---|---|---|---|---|---|
| Control | 0 | 0 | | 0 | Melts |
| Control | 1 or 2 | 0 | | (1) | (1) |
| A | 1 | 3.5 | 20 | 107 | 126 |
| B | 1 | 7.0 | 20 | 136 | 185 |
| C | 1 | 14.0 | 20 | 174 | 83 |
| D | 1 | 3.5 | 40 | 112 | 133 |
| E | 1 | 7.0 | 40 | 156 | 86 |
| F | 1 | 14.0 | 40 | 286 | 94 |

1 Complete disintegration to gas.

EXAMPLE 2

Heat-curable compositions of this invention can also be prepared by the following general procedure. The polyoxyethylene is dissolved in an alcohol such as methyl or ethyl alcohol and the peroxide and crosslinking agent added with stirring to form an intimate mixture. The solution is then coated on a substrate and the alcohol evaporated at room temperature or at temperatures up to about 120° C., to yield the heat-curable coating on the substrate. The alcohol can also be evaporated by drying it under vacuum. The substrate coated with the heat-curable composition of this invention is then placed in an oven and heated at 160° C. for a period of time sufficient to cause the peroxide to decompose and thereby cause the crosslinking of the polyoxyethylene heat-curable composition. The following table gives the results of several such experiments wherein the drying time and the cure time at 160° C. were varied.

TABLE 2

| Drying | Cure at 160° C. (min.) | Tensile at 125° C. (p.s.i.) | Elongation at 125° C. (percent) |
|---|---|---|---|
| Dried in air | 20 | 193 | 60 |
| 90° C., overnight, vacuum | 20 | 213 | 67 |
| 80° C., overnight, vacuum | 40 | 251 | 62 |
| 90° C., 32 hrs., vacuum | 40 | 305 | 91 |

These alcoholic solutions were also employed to coat wood, glass fibers, cloth and plastic screening and then cured to yield good adherent coatings.

Table 3 gives the effect of submerging the heat-cured compositions of Example 1 of this invention in boiling water for varied periods of time. Table 3 also gives the variation of gain in weight in boiling water with the amount of the crosslinking agent added. In all instances, the compositions comprise 100 parts of polyoxyethylene, 1 part of dicymyl peroxide with the shown amount of triallylcyanurate.

TABLE 3

| | Cure at 160° C. (min.) | Boiling H₂O 15 minutes, wt. gain (percent) | Boiling H₂O 60 minutes, wt. gain (percent) |
|---|---|---|---|
| Triallylcyanurate: | | | |
| 3.5 | 20 | 82 | 91 |
| 7 | 20 | 66 | 74 |
| 14 | 20 | 54 | 58 |
| 3.5 | 40 | 69 | 91 |
| 7 | 40 | 58 | 68 |
| 14 | 40 | 48 | 50 |

EXAMPLE 3

Polyoxyethylene (100 parts) was placed on a two-roll differential speed rubber mill at 80° C.–90° C. and diallylphthalate (15 parts) added with milling to give an intimate dispersion.

Dicumyl peroxide (1 part) was added and the milling continued to obtain a uniform dispersion. The mixture was press-cured at 155° C. for 30 minutes to yield a tough, cross-linked water-insoluble polymer. When this material was placed in water heated to 50° C. for 5 minutes, it showed a weight gain of 80.5% and was rubbery and flexible.

It is to be understood that the invention is not to be limited to the exact details or operation exact compounds and compositions shown and described in the above examples. It is obvious that modifications and equivalents would be apparent to one skilled in the art.

What is claimed is:

1. A heat-curable composition convertible to an aqueous membrane capable of a gain of weight when submerged in hot water for at least 15 minutes of at least 48%, consisting essentially of, by weight, 100 parts of a polyoxyethylene free of unsaturation and having a molecular weight of from 20,000 to 20,000,000, from 0.1 to 10 parts of a free radical vulcanizing agent and from 0.5 to 40 parts of an organic crosslinking agent containing at least two carbon-to-carbon aliphatically unsaturated double bonds selected from the class consisting of allyl acrylate, allyl methacrylate, methylene dimethacrylate, ethylene dimethacrylate, triethylene glycol dimethacrylate, diallyl maleate, diallyl phthalate, ethylene glycol bis (allyl carbonate), resorcinol dimethacrylate, triallyl cyanurate, triallyl isocyanurate, pentaaerythritol tetramethacrylate, glycerol trimethacrylate, allyl acrylamide, allyl methacrylamide, N,N'-methylenediacrylamide, 2,4-tolylenedimaleimide, 1,4-cyclohexylene-dimaleimide and m-phenylenedimaleimide.

2. A composition as in claim 1 wherein the free radical vulcanizing agent is dicumyl peroxide and the organic crosslinking agent is triallylcyanurate.

3. A composition as in claim 1 wherein the free radical vulcanizing agent is dicumyl peroxide and the organic crosslinking agent is diallylphthalate.

4. The heat-cured composition of claim 1.

5. The heat-cured composition of claim 2.

6. The heat-cured composition of claim 3.

7. A process for producing a crosslinked polyoxyethylene suitable for making an aqueous membrane capable of a gain of weight when submerged in hot water for at least 15 minutes of at least 48%, which comprises forming, a mixture consisting essentially of, by weight, 100 parts of polyoxyethylene free of unsaturation and having a molecular weight of from 20,000 to 20,000,000, from 0.5 to 40 parts of an organic crosslinking agent containing at least two carbon-to-carbon aliphatically unsaturated double bonds selected from the class consisting of allyl acrylate, allyl methacrylate, methylene dimethacrylate, ethylene dimethacrylate, triethylene glycol dimethacrylate, diallyl maleate, diallyl phthalate, ethylene glycol bis(allyl carbonate), resorcinol dimethacrylate, triallyl cyanurate, triallyl isocyanurate, pentaaerythritol tetramethacrylate, glycerol trimethacrylate, allyl acrylamide, allyl methacrylamide, N,N' - methylenediacrylamide, 2,4-tolylenedimaleimide, 1,4-cyclohexylenedimaleimide, and m-phenylenedimaleimide and from 0.1 to 10 parts of a free radical vulcanizing agent, and heating said mixture to a temperature sufficiently elevated so as to crosslink said polyoxyethylene.

8. A process as in claim 7 wherein the organic free radical vulcanizing agent is dicumyl peroxide and the organic crosslinking agent is triallylcyanurate.

9. A process as claimed in claim 8 wherein the organic peroxide is dicumyl peroxide and the temperature to which the admixture is heated is from 140° C. to 175° C.

10. A process as claimed in claim 7 wherein the organic peroxide is dicumyl peroxide and the organic crosslinking agent is diallylphthalate.

References Cited

UNITED STATES PATENTS

| | | | |
|---|---|---|---|
| 3,345,347 | 10/1967 | Elfers et al. | 260—2X |
| 3,398,074 | 8/1968 | Eguchi et al. | 260—874X |
| 3,418,354 | 12/1968 | Wheeler | 260—874X |
| 3,438,933 | 4/1969 | Bartsch | 260—879X |

FOREIGN PATENTS

| | | | |
|---|---|---|---|
| 1,034,266 | 6/1966 | Great Britain | 260—878 |

MURRAY TILLMAN, Primary Examiner

H. ROBERTS, Assistant Examiner

U.S. Cl. X.R.

117—124, 127, 128, 138.8, 148; 210—24; 260—2, 2.1, 878, 901